(12) United States Patent
Lou et al.

(10) Patent No.: US 9,824,699 B1
(45) Date of Patent: Nov. 21, 2017

(54) LUMPED-PARAMETER THERMAL MODEL OF A WRITE TRANSDUCER FOR CLEARANCE CONTROL ON MAGNETIC RECORDING DEVICE

(71) Applicant: Seagate Technology LLC, Cupertino, CA (US)

(72) Inventors: Huazhou Lou, Eden Prairie, MN (US); Jason W. Riddering, Prior Lake, MN (US); Richard Edward Martin, Longmont, CO (US); Michael P. DeFeo, Westminster, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/420,468

(22) Filed: Jan. 31, 2017

(51) Int. Cl.
*G11B 11/00* (2006.01)
*G11B 5/09* (2006.01)
*G11B 5/00* (2006.01)
*G11B 11/105* (2006.01)
*G11B 5/60* (2006.01)
*G11B 7/126* (2012.01)
*G11B 5/58* (2006.01)

(52) U.S. Cl.
CPC .............. *G11B 5/09* (2013.01); *G11B 5/58* (2013.01); *G11B 5/6005* (2013.01); *G11B 5/6088* (2013.01); *G11B 7/126* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| 7,253,978 B2 | 8/2007 | Lee et al. | |
| 8,934,188 B1 | 1/2015 | Kim et al. | |
| 9,240,205 B1 | 1/2016 | Gao et al. | |
| 2006/0072229 A1* | 4/2006 | Yun | G11B 5/09 360/31 |
| 2007/0263309 A1* | 11/2007 | Lee | G11B 5/09 360/31 |
| 2008/0002267 A1* | 1/2008 | Jang | B82Y 10/00 360/46 |
| 2013/0128375 A1* | 5/2013 | Livshitz | G11B 5/02 360/48 |
| 2014/0126077 A1* | 5/2014 | Contreras | G11B 5/02 360/46 |
| 2015/0213813 A1* | 7/2015 | Lammers | G11B 20/10018 360/46 |
| 2016/0260455 A1* | 9/2016 | Dina | G11B 20/10222 |
| 2017/0060442 A1* | 3/2017 | Dunn | G06F 3/0608 |

* cited by examiner

*Primary Examiner* — Tan X Dinh
(74) *Attorney, Agent, or Firm* — Hollingsworth Davis, LLC (57) ABSTRACT

A lumped-parameter function δ is determined that represents an average power dissipated by a write transducer when writing a signal to a magnetic recording medium. Temperatures of the write transducer are measured while varying the parameters to determine constants of the function δ. The function δ is used to adjust power applied to a clearance control heater when writing to the magnetic recording medium.

20 Claims, 7 Drawing Sheets

LUMPED-PARAMETER THERMAL MODEL OF A WRITE TRANSDUCER FOR CLEARANCE CONTROL ON MAGNETIC RECORDING DEVICE

SUMMARY

The present disclosure is directed to a method, system, and apparatus using a lumped-parameter thermal model of a write transducer for clearance control. In one embodiment, a lumped-parameter function δ is determined that represents an average power dissipated by a write transducer when writing a signal to a magnetic recording medium. Parameters of the function δ include write current $I_w$, overshoot amplitude $O_a$, overshoot duration $O_d$, and frequency f. Temperatures of the write transducer are measured while varying the parameters to determine constants of the function δ. The function δ is used to adjust power applied to a clearance control heater when writing to the magnetic recording medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic data storage devices such as hard disk drives. A hard disk drive utilizes a magnetic read/write head to record data to and read data from a magnetic disk. The read/write head (also referred to as a slider) is held close to the disk without touching the disk. A bottom surface of the read/write head is configured as an air bearing surface (ABS) that causes the read/write head to be separated from the disk by a thin layer of air. The read/write head may include other features (described below) that facilitate finely controlling the spacing between transducers of the read/write head to account for surface irregularities or other imperfections that could result in non-optimal spacing and/or head-to-disk contact.

As the areal density of modern perpendicular media has increased, the head-to-media clearances have decreased. This is due at least in part to the reduced magnetic flux produced by the smaller bit regions. Decreasing the head-to-media clearance increases the sensitivity of the read transducer and the strength of write magnetic field, enabling it to better read and write the smaller bits. Generally, a clearance controller such as a heater is used to finely control head-to-media clearance at the read and write transducers. The heater induces local protrusion from the ABS, allowing the clearance between transducers (e.g., write pole, reader stack) and disk to be finely controlled. Maintaining smaller clearances for newer devices requires increasing levels of accuracy and reliability of the clearance control systems.

During write operation, a writer coil is energized. The coil generates heat which causes writer protrusion. Writer-induced protrusion adds to the protrusion induced by the clearance heater and should be accounted for to achieve accurate clearances when recording data. Because clearances during recording can be affected by both the heater and writer, it can be more complicated to control write clearances than to control read clearances. For example, the clearance heater may be configured with a current boost just before recording to simulate writer-induced protrusion, the boost being removed as recording begins. This can help the head come into thermal equilibrium faster at the start of writing.

Setting writer clearances can be even more challenging in devices utilizing heat-assisted magnetic recording (HAMR), also referred to as energy-assisted magnetic recording (EAMR), thermally-assisted recording (TAR), thermally-assisted magnetic recording (TAMR), etc. In a HAMR device, a laser directs light to a near-field transducer, which concentrates the optical energy into a tiny optical spot in a recording layer of the disk. The hotspot raises the media temperature locally, reducing the writing magnetic field required for high-density recording. The laser and optics integrated into the read/write head are another source of writer induced protrusion, one that is much larger and more variable than conventional, e.g., perpendicular magnetic recording (PMR) drives. The processes used to compensate for laser-induced write protrusion are beyond the scope of this disclosure. However a HAMR device, like a PMR device, will benefit from more accurate measures of protrusion that are caused by the writer coil, pole, and other magnetic components of the write head.

Figure 1:
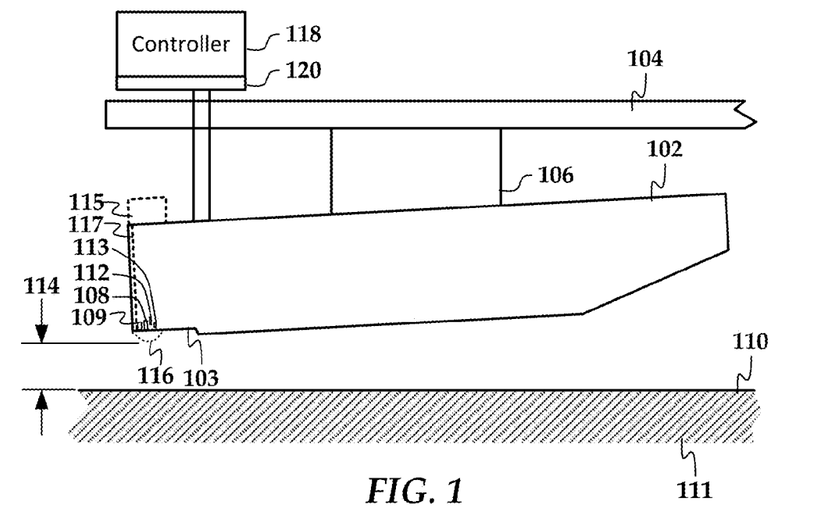
FIG. 1 is a block diagram of an apparatus according to an example embodiment.

The present disclosure relates to methods and apparatuses that measure and compensate for write induced protrusion with high accuracy. These methods and apparatuses can be used in conventional (e.g., PMR) and/or HAMR drives. In FIG. 1, a diagram illustrates an apparatus with a read/write head 102 and magnetic recording medium 111 (e.g., magnetic disk) according to an example embodiment. The read/write head 102 may also be referred to herein as a slider, read head, recording head, write head, etc. The read/write head 102 is coupled to an arm 104 by way of a suspension 106. The read/write head 102 includes at least one read transducer 108 and at least one write transducer 109 at a media-facing surface 103, e.g., ABS.

The transducers 108, 109 are held proximate to a surface 110 of the magnetic recording medium 111 while reading and writing data. The media-facing surface 103 includes air-bearing features that cause the read/write head 102 to be separated from the moving recording surface 110 via a thin layer of air. A heater 112 is activated to adjust a clearance 114 between the transducers 108, 109 and the recording surface 110. The heater 112 causes a local protrusion 116 due to thermal expansion of material surrounding the transducers 108, 109. By controlling a current supplied to the heater 112, the clearance 114 can be actively adjusted. The clearance 114 may also be referred to as adaptive fly height (AFH) or head-to-media spacing (HMS).

A thermal sensor 113 may also be located near the read and write transducers 108, 109. In one embodiment, the thermal sensor 113 has a known temperature coefficient of resistance (TCR) that causes resistance of the sensor 113 to change as a function of temperature. These temperature readings can be used for a number of measurements, including estimation of HMS during read and write operations.

The read/write head 102 may optionally be configured as a HAMR device, in which case a laser 115 (or other energy source) may be mounted on or otherwise integrated with the read/write head 102. An optical path 117 delivers light from the laser 115 to a location near the write transducers 109. The light is shaped and directed to form a hotspot in a recording layer of the recording medium 111.

A controller 118 includes logic circuits that control current supplied to the heater 112, as well controlling the as sending and receiving of signals to and from the recording head. Those signals include read and write channel data, sensor data, laser control, clearance heater control, etc. Interface circuitry 120 conditions the signals between the controller 118 and the read/write head, performing pre-amplification, filtering, analog-to-digital conversion, digital-to-analog conversion, encoding, decoding, etc.

An accurate measure of spacing between the read transducer and the recording medium can be obtained, e.g., by using test patterns recording on the disk with multiple frequencies. By using a harmonic sensor and the Wallace loss equation, the separation between the read transducer and the disk can be determined. The spacing between the writer and the recording medium can be estimated based on the read transducer spacing and the head geometry. This spacing corresponds to the amount of protrusion, and so in the following discussion the terms protrusion and HMS are assumed to be analogous.

Figure 2:
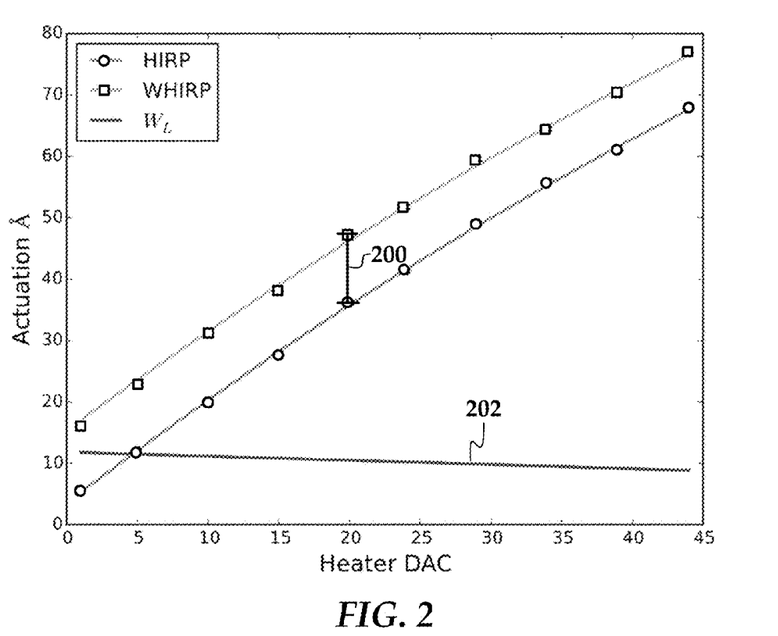
FIGS. 2 and 3 are graphs illustrating types of write protrusion according to an example embodiment.

In FIG. 2, a graph shows an example measurement of heater-induced write protrusion (HIRP). The HIRP is the protrusion induced by just the clearance heater, and may vary based on the radial location of the head over the disk. The graph in FIG. 2 also shows measurements of writer-plus-heater-induced write protrusion (WHIRP), which is the HIRP plus protrusion caused by heating induced by the write coil. The writeloss, $W_L$, is the approximately the difference between these two values ($W_L \propto$ WHIRP-HIRP) as indicated by bar 200, and captures the heating input of the writer alone.

The HIRP and WHIRP values are modeled as shown in Equations (1) and (2) below, where D is the heater digital-to-analog (DAC) input, R is the radius of the read/write head over the disk, and all of the 'c' values are constants. The radius value R can affect HIRP and WHIRP because relative velocity between the head and the disk changes with radius, and this change in velocity can affect heat transfer between the head and disk. The respective curve fits of and HIRP, WHIRP according to Equations (1) and (2) are also shown in the graph of FIG. 2. Curve 202 also shown in FIG. 2 is an estimate of $W_L$ (WHIRP-HIRP).

$$\text{HIRP} = c_0{}^h + c_1{}^h D + c_2{}^h D^2 + c_3{}^h R + c_4{}^h DR + c_5{}^h R^2 \quad (1)$$

$$\text{WHIRP} = c_0{}^w + c_1{}^w D + c_2{}^w D^2 + c_3{}^w R + c_4{}^w DR + c_5{}^w R^2 + c_6{}^w W_L + c_7{}^w W_L R + c_8{}^w W_L D + c_9{}^w W_L{}^2 \quad (2)$$

Note that the writeloss shown in FIG. 2 is for a fixed setting of parameters/variables that can be applied by a preamplifier when energizing the write coil. Those variables include steady state current ($I_w$), overshoot amplitude ($O_a$), overshoot duration ($O_d$), and frequency (f). A change in these parameters, as well as changes to radius, R can change $W_L$. A polynomial model of $W_L$ using these parameters is shown in Equation (3) below.

$$W_L = c_0 + c_1 R + c_2 R^2 + c_3 f + c_4 f R + c_5 f^2 + c_6 I_w + c_7 I_w R + c_8 I_w f + c_9 I_w{}^2 + c_{10} O_a + c_{11} O_a R + c_{12} O_a f + c_{13} O_a I_w + c_{14} O_a{}^2 + c_{15} O_d + c_{16} O_d R + c_{17} O_d f + c_{18} O_d I_w + c_{19} O_d O_a + c_{20} O_a{}^2 \quad (3)$$

Figure 3:
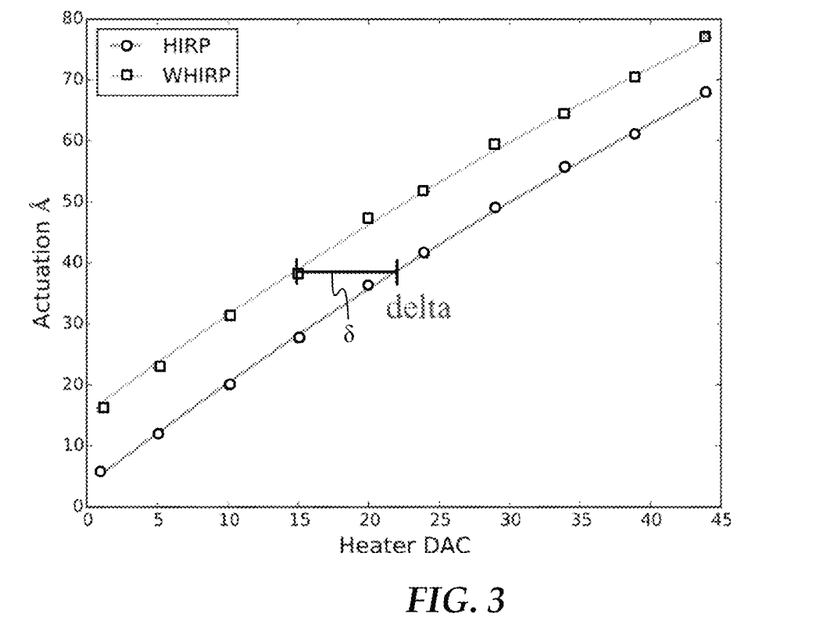

Equations (4) and (5) below show an alternate model for HIRP and WHIRP. These equations exploit similarities between HIRP and WHIRP, e.g., the terms in parentheses are nearly the same for both equations. This solution uses fewer parameters than Equations (1) and (2) due to the elimination of protrusion form of $W_L$ However, a writeloss parameter in a different form will still be used with the modeling. One way to do this that integrates with the model of Equations (4) and (5) is to model the writeloss as an equivalent heater input 6, as shown in Equation (6) and in the graph of FIG. 3.

$$\text{HIRP} = (a_1 R + a_0) D^2 + (b_4 R^4 + b_3 R^3 + b_2 R^2 + b_1 R + b_0{}^h) D + c_2{}^h R^2 + c_1{}^h R^2 + c_0{}^h \quad (4)$$

$$\text{WHIRP} = (a_1 R + a_0) D^2 + (b_4 R^4 + b_3 R^3 + b_2 R^2 + b_1 R + b_0{}^h) D + c_2{}^w R^2 + c_1{}^w R + c_0{}^w \quad (5)$$

$$\text{WHIRP}(D) = \text{HIRP}(D + \delta) \quad (6)$$

Figure 4:
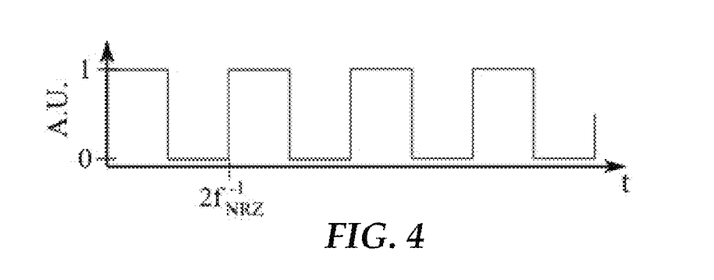
FIGS. 4, 5, and 6 are graphs illustrating determination of a heater-equivalent write protrusion according to an example embodiment.
Figure 5:
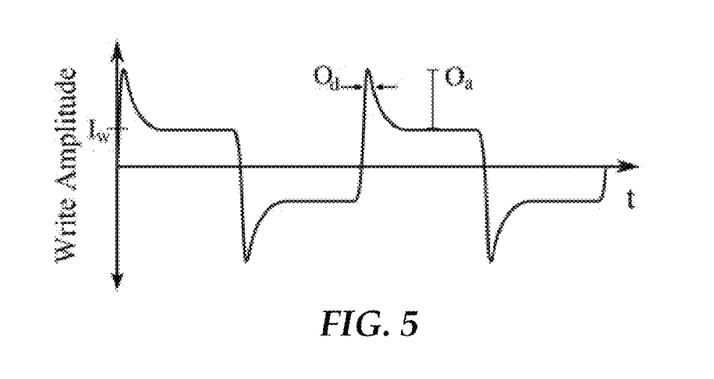
Figure 6:
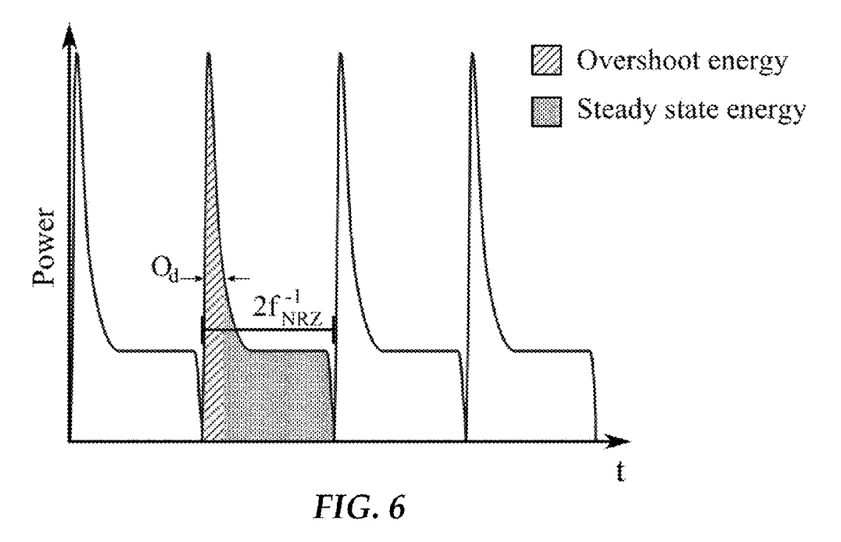

Generally, Equation (3) models the write head as a resistive heater, although a portion of the applied write current is converted to heat by the head. In FIGS. 4-6, graphs show how the heater-equivalent writeloss value can be modeled. In FIG. 4, a non-return-to-zero (NRZ), 2T signal is shown as it would be generated by logic circuits of a controller. In FIG. 5, the 2T signal is shown as it is applied to the write coil after conditioning by the preamplifier using the indicated write control variables. Note the values of the write triplet $I_w$, $O_a$, and $O_d$ are shown in FIG. 5, while the write frequency f is shown in FIG. 4 as a function of the period of the square wave.

A signal written using the illustrated 2T pattern for a given NRZ frequency and write triplet will carry power proportional to the square of the signal amplitude (P $\alpha$ $A^2$). The graph in FIG. 6 shows the power of the signal shown in FIG. 5. The energy of a single bit is integral of power over time. As indicated in FIG. 6, this integral can be divided into two contributions to energy: steady-state and overshoot. Therefore, an estimate of the energy for a single bit is shown in Equations (7)-(9) below, where $E_O$ is the overshoot energy, and $E_{SS}$ is the steady-state energy as indicated by the respective shaded regions in FIG. 6. The average power over the write gate for the 2T signal is shown in Equations (10)-(12), where $P_O$ is the overshoot power, and $E_{SS}$ is the steady-state power. If it is assumed that $\delta(I_w, O_a, O_d, f) \alpha P_{avg}$, then expanding and simplifying Equation (10) gives Equation (13).

$$E \propto E_O + E_{SS} \quad (7)$$

$$E_O = (I_w + O_a)^2 O_d \quad (8)$$

$$E_{SS} = I_w^2 \left( \frac{2}{f} - O_d \right) \quad (9)$$

$$P_{avg} \propto P_O + P_{SS} \quad (10)$$

$$P_O = (I_w O_a)^2 O_d f \quad (11)$$

$$P_{SS} = I_w^2 (2 - O_d f) \quad (12)$$

$$\delta \propto c_0 + c_1 I_w^2 O_d f + c_2 O_a^2 O_d f + c_3 I_w O_a O_d f + c_4 I_w^2 \quad (13)$$

Figure 7:
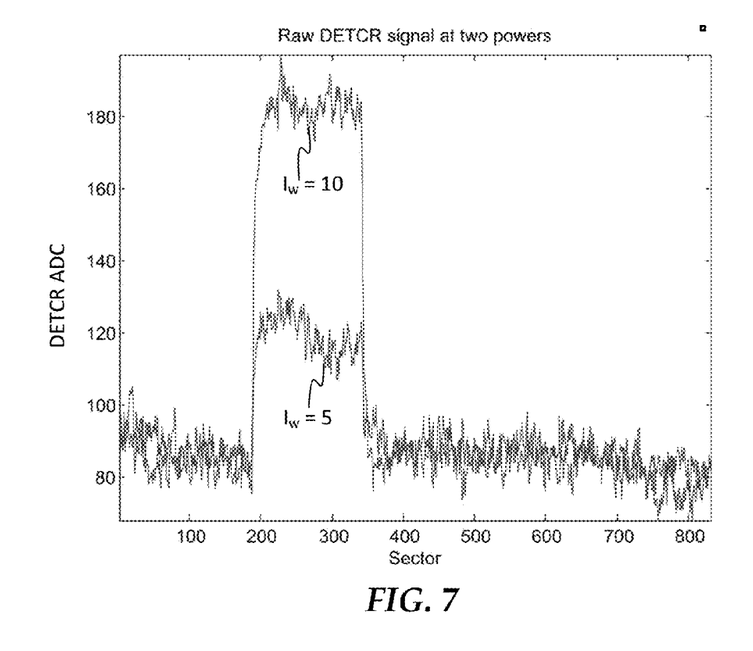
FIG. 7 is a graph showing temperature measurements made at different write powers according to an example embodiment.
Figure 8:
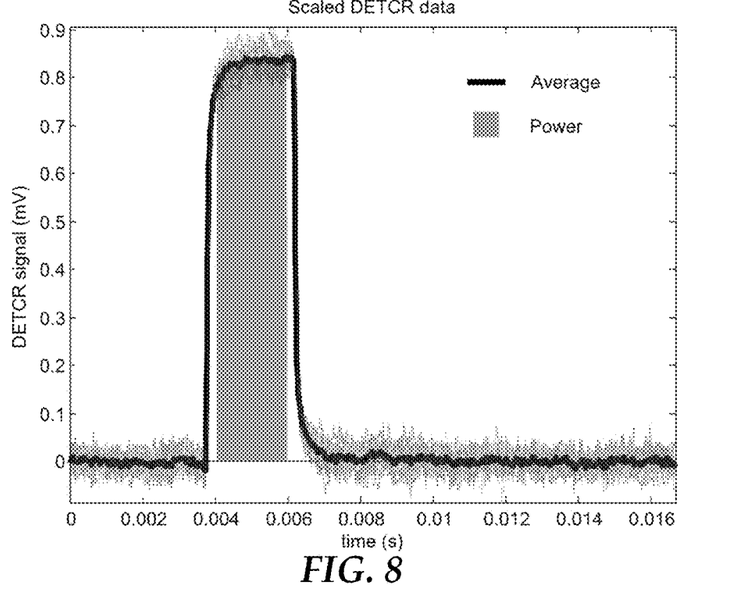
FIG. 8 is a graph showing determination of equivalent power based on temperature measurements according to an example embodiment.
Figure 9:
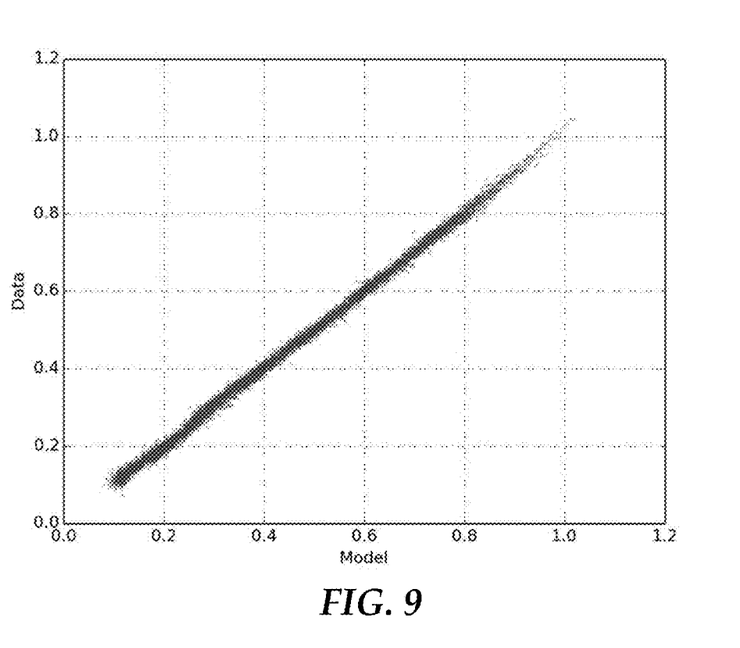
FIG. 9 is a graphs showing correlation of a physical model of write protrusion with measurements according to an example embodiment.

In order to validate this model, the average power at a read/write head was measured while writing using a thermal sensor, in particular a DC, differential-ended, temperature coefficient of resistance sensor (DETCR). For each of a number of repetitions, the write triplet and linear data density (which corresponds to write frequency) was set. The thermal sensor signal was recorded for 832 sectors. At the 180$^{th}$ sector, the write gate was asserted and write commenced for 140 sectors. This is repeated for different write triplets and frequency. In FIG. 7, a graph shows an example of results of this procedure for two different values of steady state current $I_w$. The results in this example are the analog-to-digital (ADC) values of the DETCR. In FIG. 8, graph shows the ADC values for one of these traces converted to millivolts, together with a shaded area indicating power dissipated during the write. In FIG. 9, a graph shows close correlation between the measured DC DETCR temperature rise data and the predicted temperature data using Equation (13).

Figure 10:
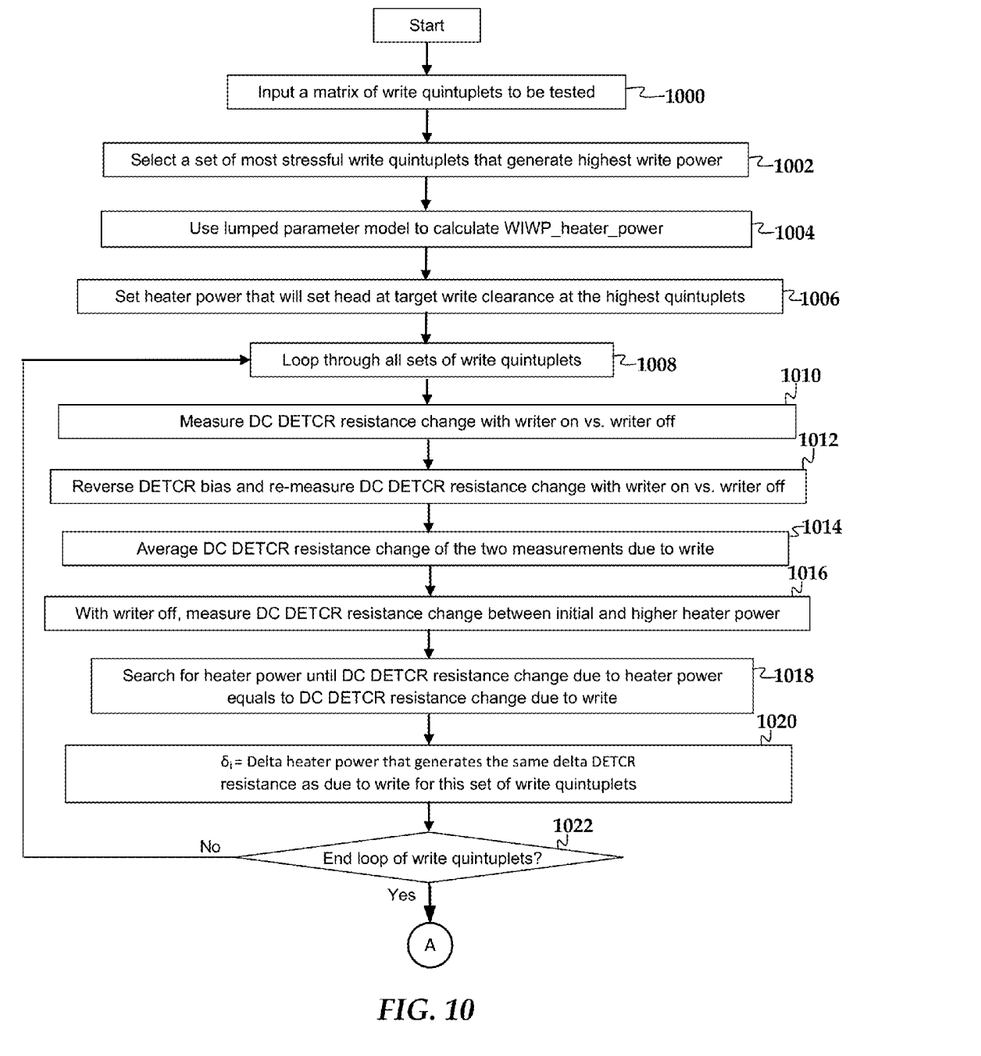
FIGS. 10 and 11 are flowcharts of a method according to an example embodiment.
Figure 11:
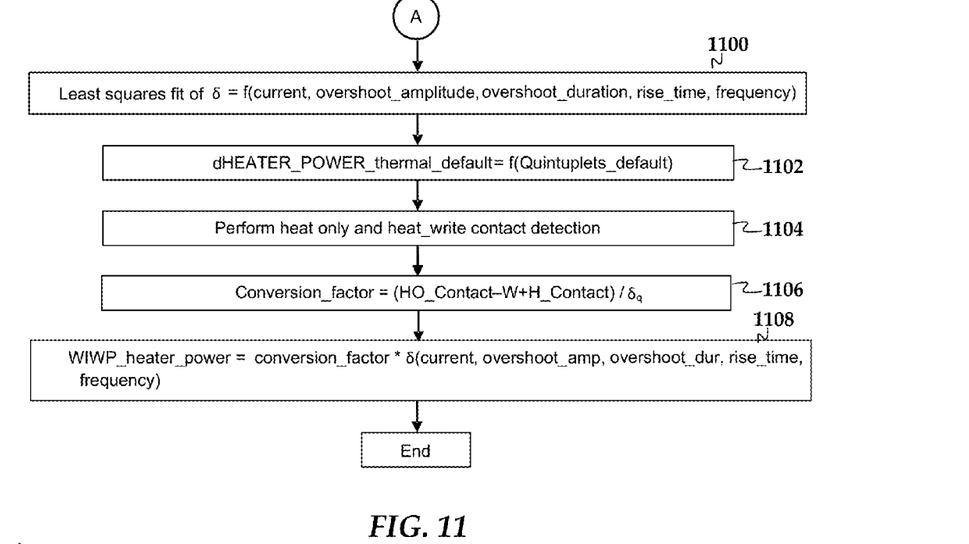

In FIGS. 10 and 11, a flowchart shows an implementation of the above-described protrusion models according to an example embodiment. A disk drive apparatus can use a DETCR embedded/built into the head to measure the temperature rise due to writer power. The DETCR should be designed to have a good thermal path from the writer to more accurately capture writer-specific temperature rise. A matrix of quintuplets is defined 1000. The quintuplets include different levels of write current, overshoot amplitude, overshoot duration, rise time and frequency. While the model described above uses four of these five parameters (not rise time), it may be adapted to include rise time, e.g., as a modifier of Equation (8) above. For example, Equation (8) may subtract part of the rise time $t_r$ from the overshoot duration: $E_O = (I_w + O_a)^2 (O_d - t_r/2)$. Alternatively, the method in FIGS. 10 and 11 may be modified to use a quadruplet without rise time instead of quintuplet.

A set of the most stressful quintuplets is selected 1002 such that the head still has clearance margin to the disc using this set of write quintuplets. This set of quintuplets defines a maximum write power and is used to calculate 1004 a first heater power (WIWP heaterpower) to be used with this maximum write power. For example, a maximum heater power clearance value with the writer off can be found that provides the desired clearance margin. Then an estimated value of δ as defined in Equation (13) above can be found from the quintuplet (e.g., using historical coefficients) and subtracted from this maximum heater power to obtain.

Figure 12:
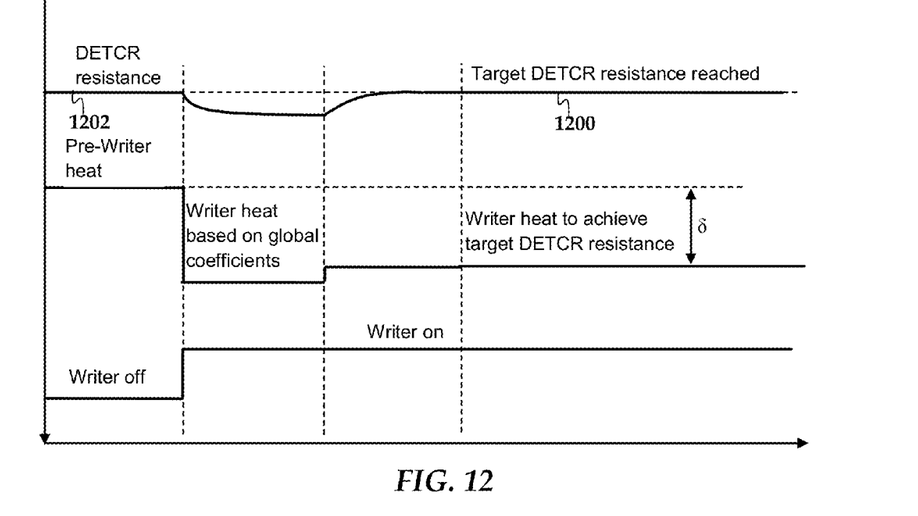
FIG. 12 is a graph illustrating the measurement of temperature with writer on and off according to an example embodiment.

The first heater power is set 1006 and a loop 1008 begins that will go through all the quintuplet sets from the matrix that was input at block 1000. Generally, there are n-unique-sets, e.g., each set having at least one parameter value different than all of the other sets. For the current, i$^{th}$ set, a DETCR resistance difference is measured 1010 between writer on and writer off. This is shown in FIG. 12, which is an example of finding a DETCR temperature value 1200 with the writer on that is the same as the value 1202 with the writer off.

When measuring DETCR resistance with the writer on, there might be electrical noise coupled from writer current to DETCR. This writer to DETCR electrical will affect DETCR resistance measurement accuracy. To eliminate the writer to DETCR coupling noise, a reverse bias measurement 1012 can be made and opposite bias measurements are averaged 1014. With the writer off, DETCR resistance difference is measured 1016 between the initial first heater power and a higher heater power. Incrementally, a higher heater power is searched for 1018 that will produce the same amount of DETCR resistance change as the writer using the current write quintuplets. The result is an equivalent heater power ($\delta_i$) that generates the same amount of heat on the DETCR as the write quintuplets for iteration i ($P_{q,i}$), as shown in block 1020 and in Equation (14) below.

$$\delta_i = P_{q,i} \quad (14)$$

As indicated by the loop end block 1022, the above measurements are repeated for all the n-sets of the matrix of quintuplets. At the end of the loop, for each write quintuplet that generated $P_{w,i}$, there is a corresponding $d_i$. The procedure continues at block 1100 in FIG. 11, where a least squares fit of all the $d_i$ measurements are to obtain δ as a function of write quintuplets. For example, a least squares fit of Equation (13) above can be used to find the coefficients $c_0$-$c_4$. At block 1102, a set of write quintuplets that are most likely used during write operation are picked as a default. At block 1104, heat-only contact detection and write-plus-heat contact detection is performed, applying the default set of write quintuplets to the write transducer when writing. The difference between heat-only contact power ($P_H$) and write-plus-heat contact power ($P_{W+H}$) is writer-induced writer protrusion at this set of write quintuplets, WIWP$_q$, as shown in Equation (15) below.

$$WIWP_q = P_H - P_{W+H} \quad (15)$$

The value of $\delta_q$ for the same write quintuplets used in contact detection calculated using Equation (13). At block 1106, the WIWP conversion factor is calculated as in Equation (16). Thereafter, the value of δ is scaled to obtain writer-induced writer protrusion in terms of the heater power for the same amount protrusion as shown in Equation (17).

$$\text{conversion\_factor} = WIWP_q / \delta_q \quad (16)$$

$$WIWP\_heater\_power = \text{conversion\_factor} * \delta \text{ (quintuplets)} \quad (17)$$

During write operation, for a set of write quintuplets, Equation (17) is used to calculate the amount of heater power that needs to be adjusted to compensate for the writer induced protrusion. When write quintuplets change, the amount of heater power adjustment will change to maintain constant writer clearance at different write quintuplets.

In some embodiments, a head thermal mechanical system may be designed that that has conversion_factor=1. This means when DETCR temperature is maintained at constant value while swapping the heat between heater and writer, the amount of protrusion is maintained at a constant value as well. The pre-heat can be used to set clearance accurately, and then use the scheme in FIG. 12 to adjust write heat in real time in both factory and field to maintain the write clearance to be equal to pre-heat clearance during write.

Figure 13:
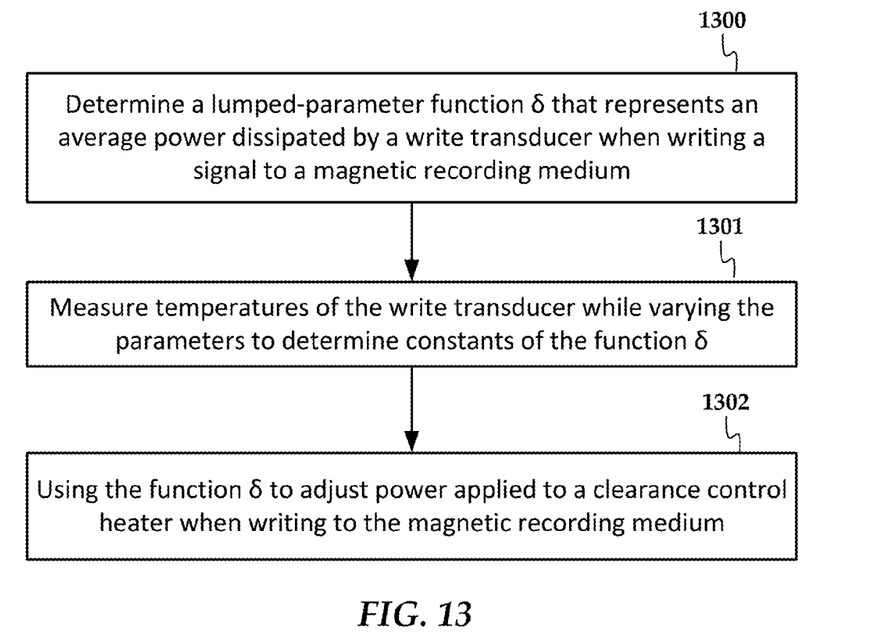
FIG. 13 is a flowchart of a method according to an example embodiment.

In FIG. 13, a flowchart shows a method according to an example embodiment. The method involves determining 1300 a lumped-parameter function δ that represents an average power dissipated by a write transducer when writing a signal to a magnetic recording medium. Parameters of the function δ include write current $I_w$, overshoot amplitude $O_a$, overshoot duration $O_d$, and frequency f. Temperatures of the write transducer are measured 1301 while varying the parameters to determine constants of the function δ. The function δ is used 1302 to adjust power applied to a clearance control heater when writing to the magnetic recording medium.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   determining a lumped-parameter function δ that represents an average power dissipated by a write transducer when writing a signal to a magnetic recording medium, parameters of the function δ including write current $I_w$, overshoot amplitude $O_3$, overshoot duration $O_d$, and frequency f;
   measuring temperatures of the write transducer while varying the parameters to determine constants of the function δ; and
   using the function δ to adjust power applied to a clearance control heater when writing to the magnetic recording medium.

2. The method of claim 1, wherein function δ is of the form $c_0+c_1I_w^2f+c_2O_a^2O_df+c_3I_wO_aO_df+c_4I_w^2$, wherein $c_0$, $c_1$, $c_2$, $c_3$, $c_4$ are the constants.

3. The method of claim 1, wherein the function δ represents a power applied to the clearance heater that will produce a same amount of protrusion as the write transducer when a predetermined combination of the parameters are applied to the write transducer when writing.

4. The method of claim 1, wherein measuring temperatures of the write head while varying the parameters comprises:
   defining a plurality of sets of the parameters; and
   for each set of the sets, writing using the parameters of the set and finding an equivalent power $δ_i$ of the clearance control heater with the writer on that produces the same measured temperature of the write transducer with the writer off.

5. The method of claim 4, wherein determining the constants of the function comprise performing a curve fit of the $δ_i$ found for the plurality of sets.

6. The method of claim 1, further comprising determining a conversion factor based on a first heater power that causes head-media contact with the writer on using a predetermined value of δ and a second heater power that causes the head-media contact with the writer off, the function δ multiplied by the conversion factor when adjusting power applied to the clearance control heater.

7. The method of claim 1, wherein the temperatures of the write transducer are measured via a differential-ended, temperature coefficient of resistance sensor embedded in a read/write head that includes the write transducer.

8. The method of claim 1, wherein δ is also a function of rise time of the signal.

9. An apparatus comprising:
   interface circuitry configured to communicate with a write transducer and a temperature sensor of a write head; and
   a controller coupled to the interface circuitry and configured to:
      determine a lumped-parameter function δ that represents an average power dissipated by the write transducer when writing a signal to a magnetic recording medium, parameters of the function δ including write current $I_w$, overshoot amplitude $O_a$, overshoot duration $O_d$, and frequency f;
      via the temperature sensor, measure temperatures of the write transducer while varying the parameters to determine constants of the function δ; and
      use the function δ to adjust power applied to a clearance control heater when writing to the magnetic recording medium.

10. The apparatus of claim 9, wherein function δ is of the form $c_0+c_1I_w^2f+c_2O_a^2O_df+c_3I_wO_aO_df+c_4I_w^2$, wherein $c_0$, $c_1$, $c_2$, $c_3$, are the constants.

11. The apparatus of claim 9, wherein the function δ represents a power applied to the clearance heater that will produce a same amount of protrusion as the write transducer when a predetermined combination of the parameters are applied to the write transducer when writing.

12. The apparatus of claim 9, wherein measuring temperatures of the write head while varying the parameters comprises:
    defining a plurality of sets of the parameters; and
    for each set i of the sets, writing using the parameters of the set and finding an equivalent power $δ_i$ of the clearance control heater with the writer on that produces the same measured temperature of the write transducer with the writer off.

13. The apparatus of claim 12, wherein determining the constants of the function comprise performing a curve fit of the $δ_i$ found for each set of the parameters.

14. The apparatus of claim 9, wherein the controller is further configured to determine a conversion factor based on a first heater power that causes head-media contact with the writer on using a predetermined value of δ and a second heater power that causes the head-media contact with the writer off, the function δ multiplied by the conversion factor when adjusting power applied to the clearance control heater.

15. The apparatus of claim 9, wherein the temperature sensor comprises a differential-ended, temperature coefficient of resistance sensor embedded in a read/write head that includes the write transducer.

16. A method comprising:
    defining a plurality of unique sets of parameters, the parameters corresponding to values applied to a write transducer, the parameters comprising write current $I_w$, overshoot amplitude $O_a$, overshoot duration $O_d$, and frequency f;
    for each unique set:
       measuring a target temperature of the write transducer with a clearance heater turned on and the writer turned off; and while writing: applying the values of the set to the write transducer; and determining a target power applied to the clearance heater that results in the target temperature being measured, the target power used to determine an equivalent clearance heater power $\delta_i$ that produces an equivalent protrusion as produced by the write transducer with the values of the set applied;

performing a curve fit of the $\delta_i$ found for the plurality of sets to determine a lumped-parameter function $\delta$ of the parameters; and using the function $\delta$ to adjust power applied to the clearance control heater when writing to a magnetic recording medium.

17. The method of claim 16, wherein function $\delta$ is of the form $c_0 + c_1 I_w^2 f + c_2 O_a^2 O_d f + c_3 I_w O_a O_d f + c_4 I_w^2$, wherein $c_0$, $c_1$, $c_2$, $c_3$, $c_4$ are the constants.

18. The method of claim 16, further comprising determining a conversion factor based on a first heater power that causes head-media contact with the writer on using a predetermined value $\delta_q$ of the function $\delta$ and a second heater power that causes the head-media contact with the writer off the function $\delta$ multiplied by the conversion factor when adjusting power applied to the clearance control heater.

19. The method of claim 16, wherein the temperatures of the write transducer are measured via a differential-ended, temperature coefficient of resistance (DETCR) sensor embedded in a read/write head that includes the write transducer.

20. The method of claim 19, wherein the DETCR sensor comprises a DC DETCR, and wherein determining the target power applied to the clearance heater when writing comprises performing two temperature measurements at opposite bias polarities applied to the DC DETCR, the two temperature measurements being averaged and the averaged value used to determine if the target temperature is being measured.

* * * * *